(12) United States Patent
Chang et al.

(10) Patent No.: US 9,135,692 B2
(45) Date of Patent: Sep. 15, 2015

(54) ELECTRONIC DEVICE AND METHOD FOR ANALYZING IMAGE NOISE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chih-Kuang Chang, New Taipei (TW); Li Jiang, Shenzhen (CN); Jia-Jia Chen, Shenzhen (CN); Dong-Hai Li, Shenzhen (CN); Jian-Hua Liu, Shenzhen (CN); Zhi-Jun Zou, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/157,537

(22) Filed: Jan. 17, 2014

(65) Prior Publication Data
US 2014/0205178 A1    Jul. 24, 2014

(30) Foreign Application Priority Data
Jan. 24, 2013  (CN) .......................... 2013 1 00272586

(51) Int. Cl.
*G06K 9/00*  (2006.01)
*G06T 7/00*  (2006.01)

(52) U.S. Cl.
CPC ..... *G06T 7/0004* (2013.01); *G06T 2207/30164* (2013.01); *G06T 2207/30168* (2013.01)

(58) Field of Classification Search
CPC .............. G06K 9/0061; G06K 9/3233; G06K 2009/3291; G06K 9/34; G06K 2009/226; G06K 2209/05; G06T 5/008; G06T 7/0022; G06T 7/408; G06T 2207/10024; G06T 2207/30168; G06T 5/001; G06T 7/0081; A61B 6/507; F41G 7/2226; H04N 1/58; H04N 5/217; G09G 2360/16; G09G 2320/0666; G09G 2340/16; G09G 2320/103; G09G 3/3607; G09G 3/2022; G09G 2320/106; G09G 3/2074; G02F 2001/134345
USPC .......... 382/141, 162, 167, 168; 348/208, 453; 358/515, 520; 345/419, 630, 426, 327, 345/428, 581, 584
See application file for complete search history.

(56) References Cited

U.S. PATENT DOCUMENTS

| | | | |
|---|---|---|---|
| 5,280,280 A * | 1/1994 | Hotto | 345/94 |
| 5,923,820 A * | 7/1999 | Cunnagin et al. | 358/1.8 |
| 6,631,206 B1 * | 10/2003 | Cheng et al. | 382/164 |

(Continued)

*Primary Examiner* — Vu Le
*Assistant Examiner* — Aklilu Woldemariam
(74) *Attorney, Agent, or Firm* — Novak Druce Connolly Bove + Quigg LLP

(57) ABSTRACT

Analyzation of image noise using an electronic device. The electronic device and method operating thereon can obtain an initial image captured by an image capturing device of an image measuring machine using an image capturing card of the electronic device when a lighting device of the image measuring machine is shut down, and magnifies an initial gray value of each pixel in the initial image to obtain an updated image. The electronic device and method operating thereon can further determine whether image noise in the updated image complies with a preset condition by analyzing an updated gray value of each pixel in the updated image, and displays the updated image and analysis results on a display device of the electronic device.

15 Claims, 4 Drawing Sheets

(56) References Cited

U.S. PATENT DOCUMENTS

| | | | |
|---|---|---|---|
| 6,633,685 B1* | 10/2003 | Kusama et al. | 382/284 |
| 8,659,795 B2* | 2/2014 | Nakamura | 358/1.9 |
| 2002/0126910 A1* | 9/2002 | Gindele et al. | 382/254 |
| 2003/0068093 A1* | 4/2003 | Baggs | 382/261 |
| 2008/0088650 A1* | 4/2008 | Chen et al. | 345/690 |
| 2008/0308670 A1* | 12/2008 | Meyer et al. | 244/3.1 |
| 2008/0316328 A1* | 12/2008 | Steinberg et al. | 348/222.1 |
| 2008/0317339 A1* | 12/2008 | Steinberg et al. | 382/167 |
| 2009/0016601 A1* | 1/2009 | Kunugi et al. | 382/162 |
| 2009/0079764 A1* | 3/2009 | Lin et al. | 345/660 |
| 2011/0090351 A1* | 4/2011 | Cote et al. | 348/208.1 |
| 2011/0169776 A1* | 7/2011 | Ouchi | 345/175 |
| 2011/0242418 A1* | 10/2011 | Hosokawa et al. | 348/576 |
| 2012/0243733 A1* | 9/2012 | Sawai | 382/103 |
| 2013/0120473 A1* | 5/2013 | Yamada | 345/690 |
| 2013/0162861 A1* | 6/2013 | Yamamoto | 348/222.1 |
| 2013/0287296 A1* | 10/2013 | Li et al. | 382/167 |
| 2013/0322753 A1* | 12/2013 | Lim et al. | 382/167 |

* cited by examiner

ELECTRONIC DEVICE AND METHOD FOR ANALYZING IMAGE NOISE

FIELD

Embodiments of the present disclosure relate to measurement technology, and particularly to an electronic device and method for analyzing image noise generated by an image measuring machine.

BACKGROUND

Outline-measuring is important in product manufacturing to ensure product quality. For example, an image measuring machine is used to capture an image of an object using a charge coupled device (CCD) lens when a lighting device of the image measuring machine is turned on, and transmit the image to an image capturing card of a test computer. Then, the image capturing card displays the image on a display screen of the test computer. The test computer can measure the object by analyzing the image corresponding to the object using an image measurement software installed in the test computer. Image noise (interference noise) can be generated by the lighting device, the CCD lens, and the image capturing card when the image is captured by the CCD lens and the image is transmitted to the image capturing card.

However, the current image measurement software merely analyzes the image noise generated by the lighting device.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION

All of the processes described below can be embodied in, and fully automated via, functional code modules executed by one or more general purpose electronic devices or processors. The code modules can be stored in any type of non-transitory readable medium or other storage device. Some or all of the methods can alternatively be embodied in specialized hardware. Depending on the embodiment, the non-transitory readable medium can be a hard disk drive, a compact disc, a digital video disc, a tape drive, or other suitable storage medium.

Figure 1:
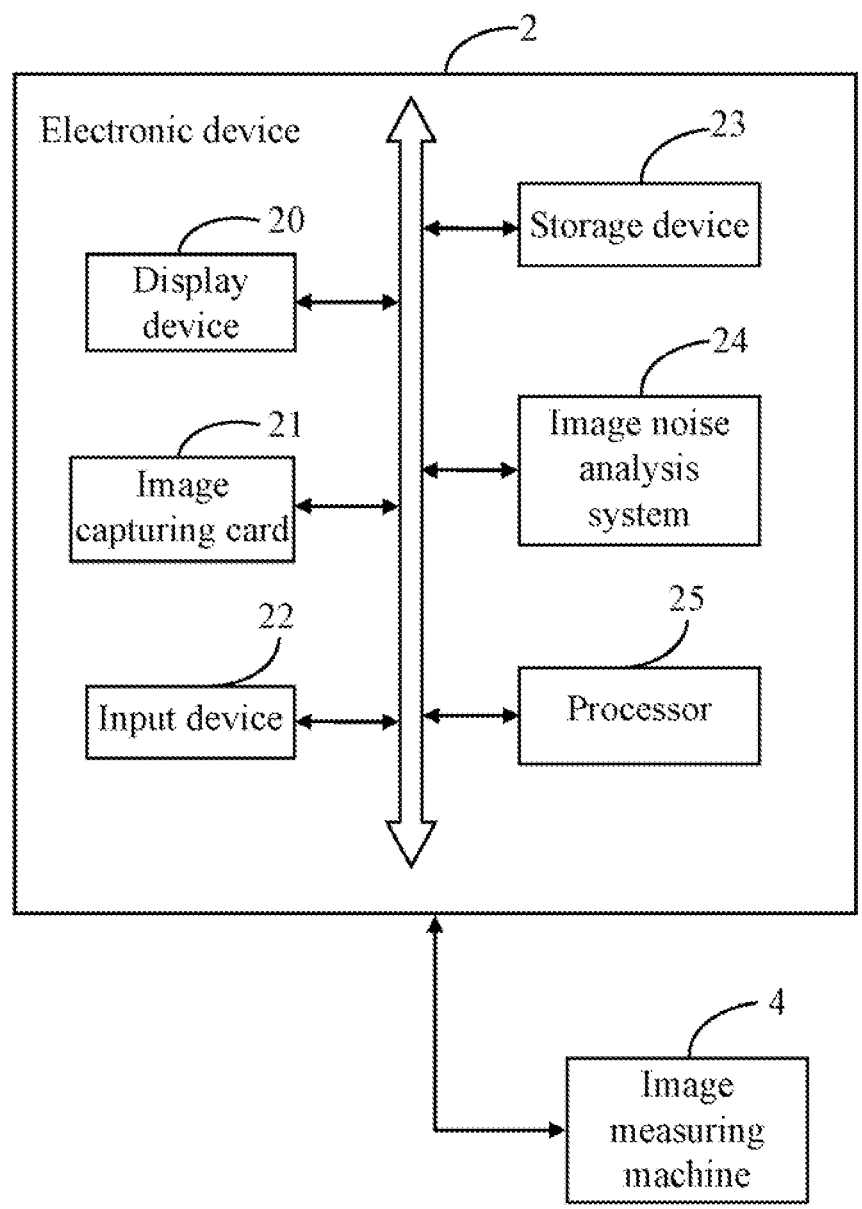
FIG. 1 is a block diagram of one embodiment of an electronic device including an image noise analysis system.

FIG. 1 is a block diagram of one embodiment of an electronic device 2 including an image noise analysis system 24. The electronic device 2 can be connected with an image measuring machine 4 through a direct coupling/connection (for example, a data bus), or an indirect coupling/connection (for example, a wireless connection). In the embodiment, the electronic device 2 further includes a display device 20, an image capturing card 21, an input device 22, a storage device 23, and at least one processor 25. It should be understood that FIG. 1 illustrates only one example of the electronic device 2 that more or fewer components than illustrated can be included, or a different configuration of the various components in other embodiments. The electronic device 2 can be a computer, a server, or any other computing device.

The display device 20 can be a liquid crystal display (LCD) or a cathode ray tube (CRT) display, and the input device 22 can be a mouse or a keyboard used to input computer readable data. The storage device 23 can be a hard disk or a flash memory.

Figure 2:
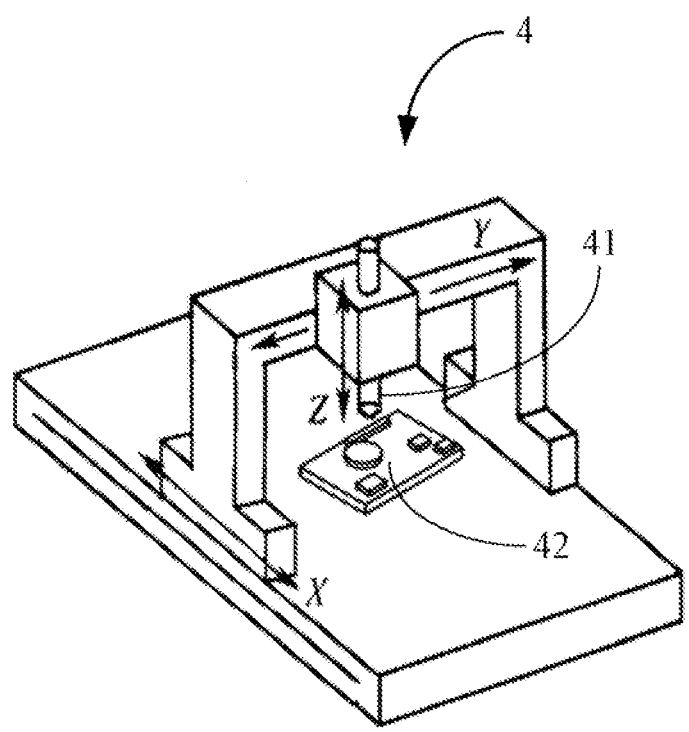
FIG. 2 is an schematic diagram of an example of an image measuring machine.

FIG. 2 shows that the image measuring machine 4 can include, but is not limited to, a charge coupled device (CCD) lens 41, an object 42 to be measured, and a plurality of driving units (not shown in FIG. 2). The driving units can include an X-axis driving motor, a Y-axis driving motor, and an Z-axis driving motor, and can be used to control the CCD lens 41 moving along an X-axis direction, a Y-axis direction, and an Z-axis direction, to capture images of the object 42. For example, the image measuring machine 4 can be a three-dimensional measuring machine.

The CCD lens 41 is used to capture images of the object 42 when a lighting device of the image measuring machine 4 is turned on, and transmit the images of the object 42 to the image capturing card of the electronic device. The lighting device can be a light which provide light for the CCD lens 41. The image capturing card displays the images of the object 42 on the display device of the electronic device. The CCD lens 41 captures the images of the object 42 when lights projected on the object 42 by the lighting device are reflected to the CCD lens 41.

The image noise analysis system is used to analyze image noise of the images of the object 42 which are generated by the CCD lens 41 and the image capturing card, to determine whether the quality of the images of the object 42 which are captured by the image measuring machine are qualified, for example, the image noise of the captured images complies with a preset condition. In one embodiment, the image noise analysis system can include computerized instructions in the form of one or more programs that are executed by the at least one processor and stored in the storage device (which can include memory). A detailed description of the image noise analysis system will be given in the following paragraphs.

Figure 3:
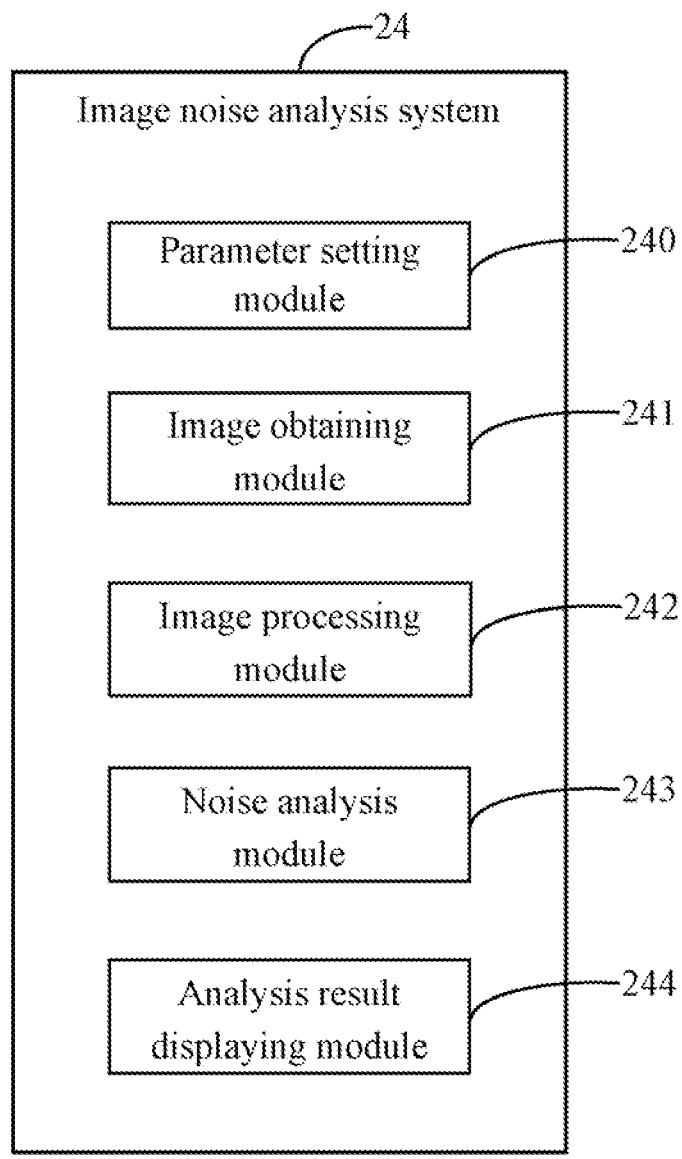
FIG. 3 is a schematic diagram of function modules of the image noise analysis system included in the electronic device.

FIG. 3 is a schematic diagram of function modules of the image noise analysis system 24 included in the electronic device. In one embodiment, the image noise analysis system 24 can include one or more modules, for example, a parameter setting module 240, an image obtaining module 241, an image processing module 242, a noise analysis module 243, and an analysis result displaying module 244.

In general, the word "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device, such as transitory computer-readable medium. Some non-limiting examples of non-transitory computer-readable medium include CDs, DVDs, flash memory, and hard disk drives.

Figure 4:
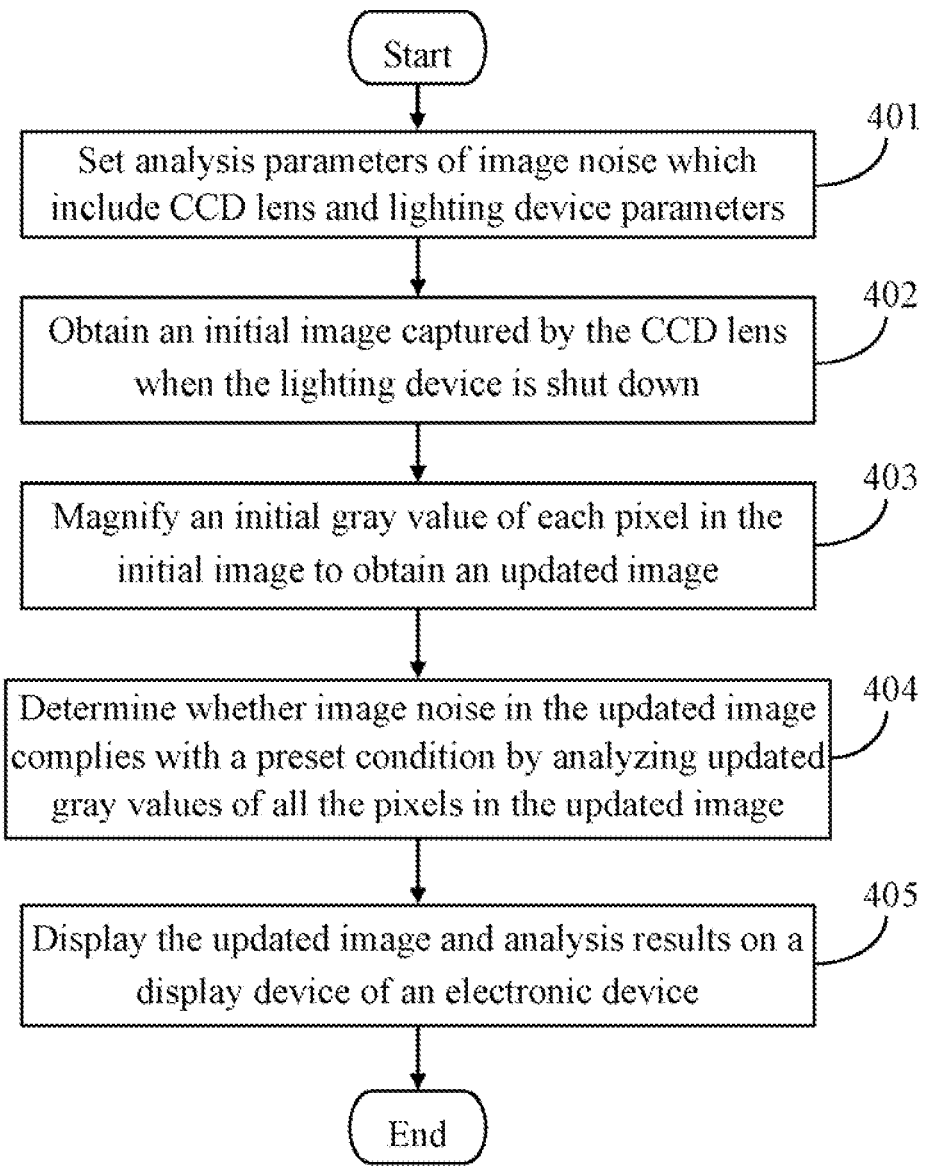
FIG. 4 is a flowchart of one embodiment of a method for analyzing image noise generated by a CCD lens and an image capturing card.

FIG. 4 is a flowchart of one embodiment of a method for analyzing image noise generated by the CCD lens and the image capturing card. Depending on the embodiment, additional blocks (steps) can be added, others removed, and the ordering of the steps can be changed.

The parameter setting module can set analysis parameters for analyzing image noise when an image measurement software of the electronic device is activated (block 401). In one embodiment, the analysis parameters can include first parameters of the CCD lens of the image measuring machine 4 (hereafter referred to as "CCD lens parameters") and second parameters of the lighting device of the image measuring machine (hereinafter referred to as "lighting device parameters"). The CCD lens parameters are first connection parameters between the CCD lens and the electronic device, such as a first transmission rate of a connection port (for example, a serial port) between the CCD lens and the electronic device, a data bit (for example, a first bit) of first transmission data between the CCD lens and the electronic device, a stop bit (for example, a last bit) of the first transmission data, and a parity bit of the first transmission data. The lighting device parameters are second connection parameters between the lighting device and the electronic device, such as a second transmission rate of a connection port (for example, a serial port) between the lighting device and the electronic device, a data bit (for example, a first bit) of second transmission data between the lighting device and the electronic device, a stop bit (for example, a last bit) of the second transmission data, and a parity bit of the second transmission data.

The image obtaining module obtains an initial image captured by the CCD lens (or other suitable image capturing device(s)) using the image capturing card when the lighting device of the image measuring machine is shut down, so that the image noise is not generated by the lighting device (block 402). In one embodiment, the initial image does not include the object when the object is not placed on a testing platform of the image measuring machine, and the initial image is a black image.

The image processing module magnifies an initial gray value of each pixel in the initial image to obtain an updated image. In one embodiment, an updated gray value of each pixel in the updated image is determined by multiplying the initial gray value by a preset magnification coefficient (block 403). For example, suppose that a size of the initial image is determined to be M×N ("M" represents a number of columns of the pixels in the initial image, "N" represents a number of rows of the pixels in the initial image), "I(i, j)" represents an initial gray value of a pixel (i, j), a formula for magnifying the initial gray value of the pixel (i, j) is determined as follows:

$$Pixel(i,j) = I(i,j) \times ((MaxGray - MinGray)/(max\{I(i,j)\} - min\{I(i,j)\})), \text{ where}$$

$$0 \leq i \leq M-1,$$

$$0 \leq j \leq N-1,$$

"MaxGray" represents a maximum threshold of the gray constant in the computer graphics technology, for example, MaxGray=255,
"MinGray" represents a minimum threshold of the gray constant in the computer graphics technology for example, MinGray=0), "max{I(i, j)}" represents a maximum value of the gray value in the initial image (for example, max{I(i, j)}=252), "min{I(i, j)}" represents a minimum value of the gray value in the initial image (for example, min{I(i, j)}=8), and "Pixel(i, j)" represents the updated gray value of the pixel (i, j).

When the updated gray value "Pixel(i, j)" is greater than 250, the updated gray value "Pixel(i, j)" is set as 255. In one embodiment, the preset magnification coefficient is determined to be (MaxGray−MinGray)/(max{I(i, j)}−min{I(i, j)}).

The noise analysis module determines whether image noise in the updated image complies with a preset condition by analyzing the updated gray values of all the pixels in the updated image (block 404). In one embodiment, the noise analysis module determines a number of the pixels whose updated gray values in the updated image are closest to 0 or 255, and determines whether the image noise in the updated image complies with the preset condition (that is, the quality of the initial image is acceptable or qualified) according to the determined number of the pixels. In one embodiment, a range of the gray value [0, 255] is divided into three preset sub-ranges, such as a first preset sub-range [0, 10] which is closing to the minimum threshold of the gray constant in the computer graphics technology (for example, zero), a second preset sub-range [220, 255] which is closing to the maximum threshold (for example, 255) of the gray constant in the computer graphics technology, and a third preset sub-range between the first preset sub-range and the second preset sub-range (10, 220).

The noise analysis module determines a first number "N1" of pixels whose gray values fall in the first preset sub-range, and calculates a first ratio "R1" of the first number "N1" of pixels in the updated image, such as R1=N1/(M×N).

The noise analysis module determines a second number "N2" of pixels whose gray values fall in the second preset sub-range, and calculates a second ratio "R2" of the second number "N2" of pixels in the updated image, such as R2=N2/(M×N).

The noise analysis module can determine a third number "N3" of pixels whose gray values fall in the third preset sub-range, and calculates a third ratio "R3" of the third number "N3" of pixels in the updated image, such as R3=N3/(M×N).

If the first ratio "R1" is greater than or equal to a first preset value (for example, 80%), or the second ratio "R2" is greater than or equal to a second preset value (for example, 85%), the noise analysis module 243 determines that the image noise in the updated image complies with the preset condition (that is, the quality of the updated image is acceptable or qualified). In one embodiment, three levels of the quality of the updated image are preset, such as a first quality level which represents the quality of the updated image is "Good" (for example, scored eighty), a second quality level which represents the quality of the updated image is "Qualified" (for example, scored sixth), and a third quality level which represents the quality of the updated image is "Un-qualified" (for example, scored fifty).

If the first ratio "R1" is greater than or equal to the first preset value (for example, 80%), the noise analysis module 243 determines that the quality of the updated image is the first quality level. If the second ratio "R2" is greater than or equal to the second preset value (for example, 85%), the noise analysis module determines that the quality of the updated image is the second quality level.

If the third ratio "R3" is greater than or equal to a third preset value (for example, 80%), the noise analysis module determines that the quality of the updated image is the third quality level, that is, the image noise in the updated image does not comply with the preset condition (that is, the quality of the updated image is un-acceptable or un-qualified). The noise analysis module determines that the quality of the updated image is qualified in other situations.

In other embodiments, the noise analysis module can determine whether the image noise in the updated image complies with the preset condition by determining whether the third ratio "R3" is greater than or equal to the third preset value. For example, if the third ratio "R3" is greater than or equal to the third preset value, the noise analysis module determines that the image noise in the updated image does not comply with the preset condition. If the third ratio "R3" is less than the third preset value, the noise analysis module determines that the image noise in the updated image complies with the preset condition.

The analysis result displaying module displays the updated image and analysis results on the display device of an electronic device (block 405). In one embodiment, the analysis result displaying module displays the updated image on the display device according to the updated gray values of all the pixels in the updated image. The analysis results can be "Good" (the first quality level), "Qualified" (the second quality level), and "Un-qualified" (the third quality level).

Because the lighting device of the image measuring machine is shut down, the image noise of the images captured by the image measuring machines is generated by the CCD lens and/or the image capturing card. When the noise analysis module determines that the image noise in the updated image complies with the preset condition, the lighting device of the image measuring machine can be turned on and the object can be placed on the testing platform of the image measuring machine, so that the CCD lens captures images of the object to measure the images of the objects.

It should be emphasized that the above-described embodiments of the present disclosure, particularly, any embodiments, are merely possible examples of implementations, merely set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for analyzing image noise using an electronic device, the method comprising:
   receiving an initial image captured by an image capturing device of an image measuring machine using an image capturing card of the electronic device when a lighting device of the image measuring machine is shut down;
   magnifying an initial gray value of each pixel in the initial image to obtain an updated image;
   determining whether image noise in the updated image complies with a preset condition by analyzing an updated gray value of each pixel in the updated image, wherein the image noise in the updated image is determined by:
   determining a first number of pixels whose gray values fall in a first preset sub-range, and calculating a first ratio of the first number of pixels in the updated image;
   determining a second number of pixels whose gray values fall in a second preset sub-range, and calculating a second ratio of the second number of pixels in the updated image;
   determining a third number of pixels whose gray values fall in a third preset sub-range, and calculating a third ratio of the third number of pixels in the updated image;
   determining that the image noise in the updated image complies with the preset condition when the first ratio is greater than or equal to a first preset value, or the second ratio is greater than or equal to a second preset value;
   determining that the image noise in the updated image does not comply with the preset condition when the third ratio is greater than or equal to a third preset value; and
   displaying the updated image and analysis results on a display device of the electronic device.

2. The method according to claim 1, wherein the updated gray value of each pixel in the updated image is determined by multiplying the initial gray value by a preset magnification coefficient.

3. The method according to claim 2, wherein the preset magnification coefficient is determined by calculating a first difference between a maximum threshold of a gray constant and a minimum threshold of the gray constant, calculating a second difference between a maximum value of the gray value in the initial image and a minimum value of the gray value in the initial image, and dividing the first difference by the second difference to obtain the preset magnification coefficient.

4. The method according to claim 1, wherein the image noise in the updated image is determined by:
   determining a specified number of pixels whose gray values fall in a preset sub-range from the updated image, and calculating a specified ratio of the specified number of pixels in the updated image; and
   determining that the image noise in the updated image does not comply with the preset condition when the specified ratio is greater than or equal to a preset value, and determining that the image noise in the updated image complies with the preset condition when the specified ratio is less than the preset value.

5. The method according to claim 1, further comprising:
   determining that a quality of the updated image is a first quality level when the first ratio is greater than or equal to the first preset value; and
   determining that the quality of the updated image is a second quality level when the second ratio is greater than or equal to the second preset value.

6. An electronic device, comprising:
   a processor;
   a storage device storing a plurality of instructions, which when executed by the processor, causes the processor to:
   receive an initial image captured by an image capturing device of an image measuring machine using an image capturing card of the electronic device when a lighting device of the image measuring machine is shut down;
   magnify an initial gray value of each pixel in the initial image to obtain an updated image;
   determine whether image noise in the updated image complies with a preset condition by analyzing an updated gray value of each pixel in the updated image, wherein the image noise in the updated image is determined by:
   determining a first number of pixels whose gray values fall in a first preset sub-range, and calculating a first ratio of the first number of pixels in the updated image;
   determining a second number of pixels whose gray values fall in a second preset sub-range, and calculating a second ratio of the second number of pixels in the updated image;
   determining a third number of pixels whose gray values fall in a third preset sub-range, and calculating a third ratio of the third number of pixels in the updated image;
   determining that the image noise in the updated image complies with the preset condition when the first ratio is greater than or equal to a first preset value, or the second ratio is greater than or equal to a second preset value;
   determining that the image noise in the updated image does not comply with the preset condition when the third ratio is greater than or equal to a third preset value; and
   display the updated image and analysis results on a display device of the electronic device.

7. The electronic device according to claim 6, wherein the updated gray value of each pixel in the updated image is determined by multiplying the initial gray value by a preset magnification coefficient.

8. The electronic device according to claim 7, wherein the preset magnification coefficient is determined by calculating a first difference between a maximum threshold of a gray constant and a minimum threshold of the gray constant, calculating a second difference between a maximum value of the gray value in the initial image and a minimum value of the gray value in the initial image, and dividing the first difference by the second difference to obtain the preset magnification coefficient.

9. The electronic device according to claim 6, wherein the image noise in the updated image is determined by:
   determining a specified number of pixels whose gray values fall in a preset sub-range from the updated image, and calculating a specified ratio of the specified number of pixels in the updated image; and
   determining that the image noise in the updated image does not comply with the preset condition when the specified ratio is greater than or equal to a preset value, and determining that the image noise in the updated image complies with the preset condition when the specified ratio is less than the preset value.

10. The electronic device according to claim 6, wherein the plurality of instructions further comprise:
    determining that a quality of the updated image is a first quality level when the first ratio is greater than or equal to the first preset value; and
    determining that the quality of the updated image is a second quality level when the second ratio is greater than or equal to the second preset value.

11. A non-transitory storage medium having stored thereon instructions that, when executed by a processor of an electronic device, causes the electronic device to perform a method for analyzing image noise, the method comprising:
    receiving an initial image captured by an image capturing device of an image measuring machine using an image capturing card of the electronic device when a lighting device of the image measuring machine is shut down;
    magnifying an initial gray value of each pixel in the initial image to obtain an updated image;
    determining whether image noise in the updated image complies with a preset condition by analyzing an updated gray value of each pixel in the updated image, wherein the image noise in the updated image is determined by:
    determining a first number of pixels whose gray values fall in a first preset sub-range, and calculating a first ratio of the first number of pixels in the updated image;
    determining a second number of pixels whose gray values fall in a second preset sub-range, and calculating a second ratio of the second number of pixels in the updated image;
    determining a third number of pixels whose gray values fall in a third preset sub-range, and calculating a third ratio of the third number of pixels in the updated image;
    determining that the image noise in the updated image complies with the preset condition when the first ratio is greater than or equal to a first preset value, or the second ratio is greater than or equal to a second preset value;
    determining that the image noise in the updated image does not comply with the preset condition when the third ratio is greater than or equal to a third preset value; and
    displaying the updated image and analysis results on a display device of the electronic device.

12. The non-transitory storage medium according to claim 11, wherein the updated gray value of each pixel in the updated image is determined by multiplying the initial gray value by a preset magnification coefficient.

13. The non-transitory storage medium according to claim 12, wherein the preset magnification coefficient is determined by calculating a first difference between a maximum threshold of a gray constant and a minimum threshold of the gray constant, calculating a second difference between a maximum value of the gray value in the initial image and a minimum value of the gray value in the initial image, and dividing the first difference by the second difference to obtain the preset magnification coefficient.

14. The non-transitory storage medium according to claim 11, wherein the image noise in the updated image is determined by:
    determining a specified number of pixels whose gray values fall in a preset sub-range from the updated image, and calculating a specified ratio of the specified number of pixels in the updated image; and
    determining that the image noise in the updated image does not comply with the preset condition when the specified ratio is greater than or equal to a preset value, and determining that the image noise in the updated image complies with the preset condition when the specified ratio is less than the preset value.

15. The non-transitory storage medium according to claim 11, wherein the method further comprises:
    determining that a quality of the updated image is a first quality level when the first ratio is greater than or equal to the first preset value; and
    determining that the quality of the updated image is a second quality level when the second ratio is greater than or equal to the second preset value.

* * * * *